United States Patent [19]

Schultze et al.

[11] Patent Number: 4,992,514

[45] Date of Patent: Feb. 12, 1991

[54] PROCESS FOR THE PRODUCTION OF SHAPED ARTICLES

[75] Inventors: Hans-Joachim Schultze, Chur; Hanns-Joerg Liedloff, Domat, both of Switzerland

[73] Assignee: EMS-Inventa AG, Switzerland

[21] Appl. No.: 252,056

[22] Filed: Sep. 30, 1988

[30] Foreign Application Priority Data

Oct. 13, 1987 [DE] Fed. Rep. of Germany ....... 3734645

[51] Int. Cl.$^5$ .......................... C08L 77/00; C08J 5/00; C08G 69/48
[52] U.S. Cl. ................................ 525/425; 264/331.19
[58] Field of Search .......................... 525/425

[56] References Cited

U.S. PATENT DOCUMENTS

| | | | |
|---|---|---|---|
| 4,567,227 | 1/1986 | Kiss | 525/425 |
| 4,728,698 | 3/1988 | Isayev et al. | 525/425 |
| 4,737,539 | 4/1988 | Jinno et al. | 525/425 |
| 4,792,587 | 12/1988 | Kanoe et al. | 525/425 |

*Primary Examiner*—Lewis T. Jacobs
*Assistant Examiner*—Vasu S. Jagannathan
*Attorney, Agent, or Firm*—Jordan B. Bierman

[57] ABSTRACT

A composition having at least 50% by weight polyamide and a liquid crystalline polymer capable of forming an optically anisotropic melt above 200° C. Such compositions are transformed by deformation at temperatures below the melting point and above the glass transition temperature of the polyamide. Shaped bodies made thereby have excellent tensile strength and elongation at break characteristics.

13 Claims, No Drawings

PROCESS FOR THE PRODUCTION OF SHAPED ARTICLES

This application claims the priority of German Application No. 37 34 645.8, filed Oct. 13, 1987.

The present invention is directed to a method of forming shaped articles wherein mixtures of polyamides and thermotropic liquid crystalline polymers are blended and shaped to form articles having high mechanical strength.

BACKGROUND OF THE INVENTION

Mixtures of polyamides and thermotropic liquid crystalline polymers have been known for some time; see, for example, DE-A No. 32 16 413. Such mixtures have been used for injection molding or extrusion to form shaped articles which have greater rigidity and strength than those obtained from polyamides alone. However, the mechanical properties of such articles are unsatisfactory. It is, therefore, an object of the present invention to produce molded or shaped articles which have improved mechanical properties and overcome the aforementioned deficiencies of the prior art.

DESCRIPTION OF THE INVENTION

It has been found that the objects of the invention can be achieved by using a composition having at least 50% by weight of one or more polyamides and also containing not more than 50%, preferably 1 to 30%, most preferably 5 to 20% of the total weight of the mixture of one or more liquid crystalline polymers which are capable of forming an optically anisotropic melt above 200° C. Such compositions are transformed into preforms (e.g. by extrusion or injection molding). The preforms are then converted into shaped articles at temperatures below the melting point and above the glass transition temperature ($T_g$) of the polyamide.

While a broad rang of polyamides is operable in the present invention, it is preferred that the ratio of amide groups to the remaining carbon atoms be from 1:4 to 1:15. Specific mention is made of lactams or ω-aminocarboxylic acid having 6 to 12 carbon atoms. Caprolactam, laurolactam, aminocaproic acid, 11-aminoundecanoic acid or 12-aminododecanoic acid have been found especially suitable. All of the foregoing compounds are well known to the person of ordinary skill.

Suitable polyamides can also be prepared from equimolar amounts of dicarboxylic acids having 6 to 13 carbon atoms and a diamine having 4 to 18 carbon atoms. These can be used alone or in mixtures.

As to the thermotropic, liquid crystalline polymers, the preferred compounds are aromatic polyesters, aromatic polyester amides, aromatic-aliphatic polyesters, and aromatic-aliphatic polyester amides. Representative samples of the aromatic polyesters having the desired liquid crystalline properties are set forth in the following U.S. Pat. Nos.

3,991,013; 3,991,014; 4,066,620; 4,067,852; 4,075 262; 4,083,829; 4,093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201 856; 4,219,461; 4,224,433; 4,226,970; 4,230 817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,279,803; 4,294,955; 4,299,756; 4,318,841; 4,337,190; 4,337,191; 4,355,134; 4,412,058; 4,429,100; 4,431,770; 4,447,592; 4,499,256; 4,500,699.

Additional such polyesters are found in DOS Nos. 35 17 270, 35 17 948, 33 25 703, 33 25 705, 33 25 787, and 33 38 623. The use of entirely aromatic polyesters with polymer chains having 4-oxybenzoyl and 4-oxy-2-naphthoyl units have been found preferable. Such polyesters are described in U.S. Pat. Nos. 4,161,470 and 4,184,996.

Examples of entirely aromatic polyester amides useful in the present invention are taught in U.S. Pat. Nos. 4,330,457; 4,351,917; 4,351,918; and 4,341,688. The aromatic-aliphatic polyesters according to the present invention include copolymers of hydroxybenzoic acid and polyalkylene terephthalate and are more fully described in U.S. Pat. Nos 3,804,805; 4,138,842; and 4,355,133. The aromatic-aliphatic polyester amides are also shown in Japanese Open For Public Inspection (OPS) No. 58/176,216. The polyesters and polyester amides of the present invention can have other functional groups on their polymer chains; e.g. imide, carbonate, urea, ether, keto, sulfide, sulfone, and azo groups. Their aromatic moieties can carry halogens or alkyl groups, especially those having 1 to 4 carbon atoms.

The components are mixed in known manner, preferably by melting and blending them in single or twin screw extruders. The compositions are transformed into preforms and the preforms having the aforementioned compositions are converted into the shaped articles at temperatures below the melt temperature and above the glass transition temperature of the polyamide. In addition, it has also been found that the conversion or transformation can also be carried out at temperatures which are substantially below the glass transition temperature of the liquid crystalline polymers. The transformation processes themselves are generally known and include injection molding, extrusion or press-stretching, injection molding press-stretching/roll press-stretching, etc. Such processes are described in, for example, Kunststoffe 72 (7) (1982) 402–407.

In the following examples, the polyamide is Polyamide 12 which is sold under the trademark Grilamid L 25 by EMS-Chemie AG of Domat/Ems, Switzerland. It had a relative solution viscosity, measured according to DIN 53 727 in a 5% solution in m-cresol, of 2.25.

The liquid crystalline polymer used was an entirely aromatic polyester having 73 mole % 4-oxybenzoyl and 27 mole % 6-oxy-2-naphthoyl moieties thereon. This product is sold under the trademark VECTRA A 900 by Celanese GmbH of Much, Germany. It forms an optically anisotropic melt above 280° C. and has a glass transition temperature of about 120° C.

In preparing the shaped articles in accordance with the present invention, two mixtures of polyamide and polymer were used. First was 85% by weight of the PA 12 and 15% by weight of the VECTRA A 900. The second was 95% by weight of the PA 12 and 5% by weight VECTRA A 900. The components were blended in a twin screw extruder ZSK-30, a product of Werner & Pfleiderer of Stuttgart, Germany. The melt temperature was 290° C. and the maximum apparatus temperature was 285° C. The screws were rotated at 180 rpm and the throughput was 8 kg/h.

The values for tensile strength and elongation at break were determined in accordance with DIN 53455 on standard tensile test bars.

EXAMPLE 1

Standard tensile test bars having a cross-section of 10 mm×4 mm were obtained from each of the above mixtures by injection-moulding press-stretching. For this purpose, using conventional process parameters for highly viscous polyamide-12, preforms having a cross-section of 10 mm×6.4 mm were prepared in a conventional injection moulding machine. The preforms were then processed in a press-stretching apparatus to give final test bars having a cross-section of 10 mm×4 mm. They were transformed at an apparatus temperature of 70° C., a moulding pressure of 65 t, and a cooling time of 210 sec. The apparatus was installed in an injection moulding machine of the Kloeckner Ferromatik FM 175 type.

The tensile test bars obtained in this way had a stretching ratio of 1.6 (ratio of their length to the length of the preforms). Determinations on these bars in accordance with DIN 53455 gave the following values:

|  | First Mixture | Second Mixture |
|---|---|---|
| Tensile Strength | 110 N/mm$^2$ | 92 N/mm$^2$ |
| Elongation at Break | 30% | 30% |

EXAMPLE 2 (COMPARATIVE)

The process according to Example 1 was carried out, the extension-stretching, however, was not performed. Determinations these test bars, performed as in Example 1, gave the following results:

|  | First Mixture | Second Mixture |
|---|---|---|
| Tensile Strength | 50 N/mm$^2$ | 46 N/mm$^2$ |
| Elongation at Break | 160% | 180% |

It is apparent that, by conducting the process according to the invention, the tensile strength and elongation at break are drastically improved. It should be noted that unreinforced polyamide-12 has a tensile strength which can be increased to only about 75 N/mm$^2$ by press-stretching.

Although only a limited number of embodiments of the present invention have been expressly disclosed, it is, nonetheless, to be broadly construed, and not to be limited except by the character of the claims appended hereto.

I claim:

1. A process for the production of shaped articles from mixtures of at least 50% by weight of at least one polyamide, having a melting point and a glass transition temperature, and at least one thermotropic liquid crystalline polymer, having a glass transition temperature, and which forms an optically anisotropic melt above 200° C., said process comprising
    forming a preform, deforming said preform at a transformation temperature below the melting point and above the glass transition temperature of said polyamide.

2. The process of claim 1 wherein said transformation temperature is below the glass transition temperature of said liquid crystalline polymer.

3. The process of claim 1 wherein a ratio of amide groups to remaining carbon atoms in said polyamide is 1:4 to 1:15.

4. The process of claim 1 wherein said polymer comprises at least one entirely aromatic polyester.

5. The process of claim 1 wherein said polymer comprises at least one entirely aromatic polyesteramide.

6. The process of claim 1 wherein said polymer comprises at least one aromatic-aliphatic polyester.

7. The process of claim 1 wherein said polymer comprises aromatic-aliphatic polyesteramide.

8. The process of claim 1 wherein said polyamide is taken from the class consisting of lactams, ω-amino carboxylic acids, and reaction products of equimolar amounts of a dicarboxylic acid having 6 to 13 carbon atoms and a diamine having 4 to 18 carbon atoms.

9. The process of claim 8 wherein said polyamide is taken from the class consisting of caprolactam, laurolactam, aminocaproic acid, 11-aminoundecanoic acid, and 12-aminododecanoic acid.

10. The process of claim 9 wherein said polyamide is laurolactam and said polymer is at least one entirely aromatic polyester.

11. Shaped articles which are the products of the process of claim 1.

12. The process of claim 1 wherein said polymer comprises 1% to 30% by weight based on the total of said polyamide and said polymer.

13. The process of claim 12 wherein said polymer comprises 5% to 20% by weight based on the total of said polyamide and said polymer.

* * * * *